Dec. 14, 1965  F. DUDTE  3,223,227
AUTOMATIC FEEDER
Filed Jan. 28, 1963
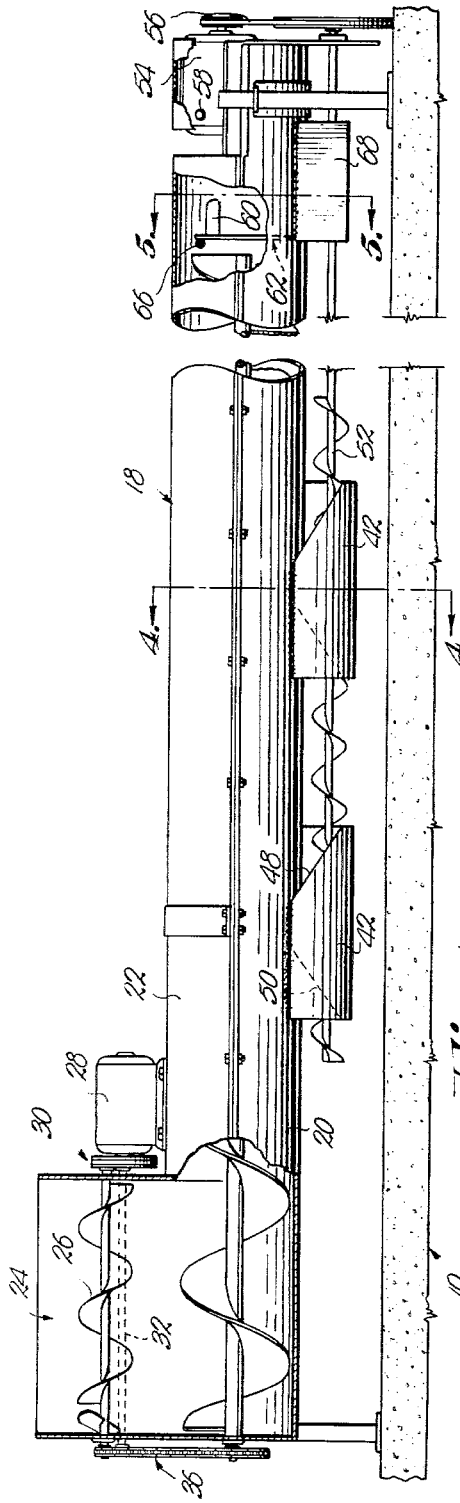
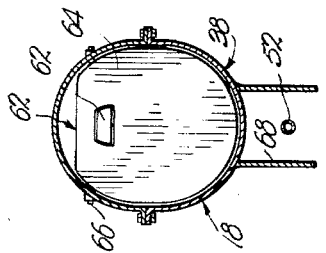
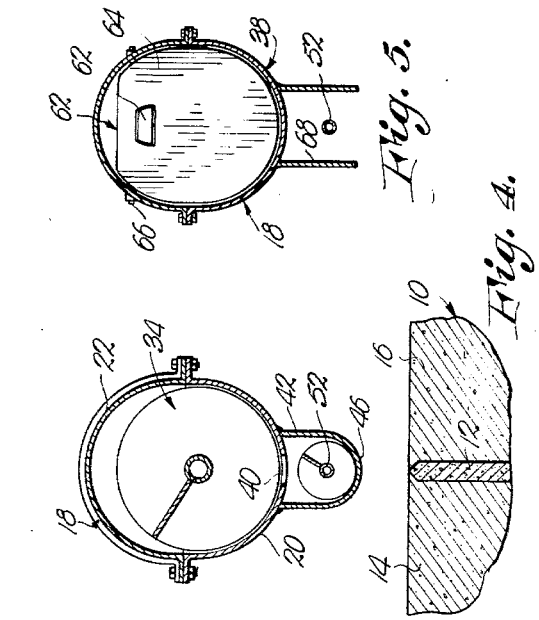
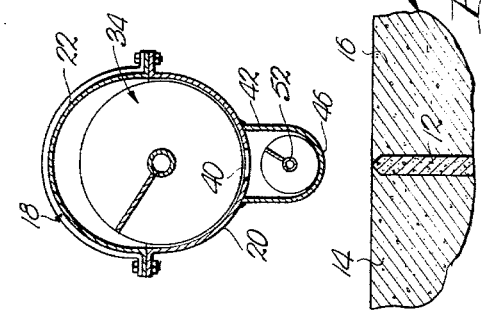
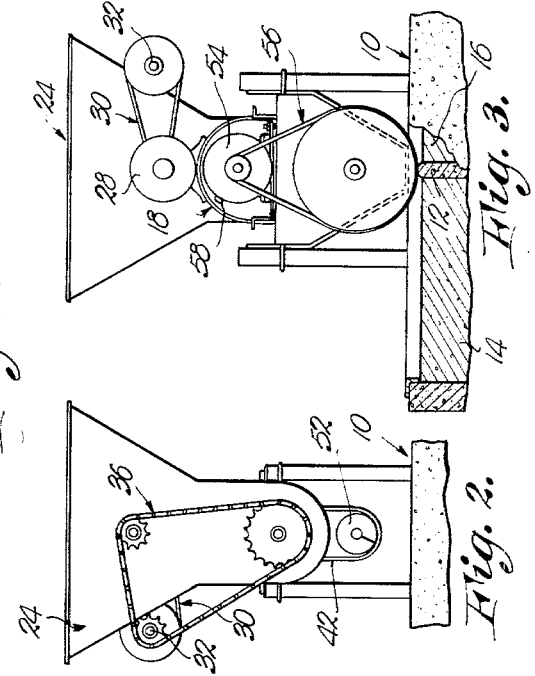
INVENTOR.
Fred Dudte
BY
Hovey, Schmidt, Johnson & Hovey
ATTORNEYS.

United States Patent Office 3,223,227
Patented Dec. 14, 1965

3,223,227
AUTOMATIC FEEDER
Fred Dudte, Newton, Kans., assignor, by mesne assignments, to Harper and Saunder, Inc., Eureka, Ill., a corporation of Illinois
Filed Jan. 28, 1963, Ser. No. 254,122
11 Claims. (Cl. 198—64)

This invention relates to a material distributor particularly adapted for use in feeding cattle, hogs and other animals, and especially suited for handling of ensilage, the primary object being even distribution automatically along a feed bunk or other feeder without separation of the materials making up the feed.

It is the most important object of my present invention to provide an automatic feeder that discharges uniformly throughout the length of a relatively long screw conveyor overlying a feed bunk.

Another important object of the instant invention is the provision of automatic feeding wherein even distribution is accomplished by first loading a series of receivers extending along the bunk thereabove and then unloading all the receivers simultaneously to the end that each zone of the bunk receives the same amount of material during each unloading cycle.

Still another important object of the present invention is to make the unloading cycle responsive to build-up of material at one end of the primary conveyor so that none of the receivers is discharged until they are all full.

It is an aim of my invention also to provide for simplicity and low cost by, for example, adapting the receivers for discharge by a single screw, common thereto.

Yet another aim of the instant invention is to adapt the feeder for use with a partitioned bunk having a pair of compartments simply by reversing the direction of rotation of the secondary screw.

A further aim of my invention is to provide a non-clogging, high capacity conveyor tube by virtue of its transverse elliptical shape and by floatingly disposing the primary conveyor screw therein.

In the drawing:

FIGURE 1 is a side elevational view of an automatic feeder made pursuant to my present invention, parts being broken away and in section for clearness;

FIG. 2 is a view showing one end thereof;

FIG. 3 is a view showing the opposite end thereof; and

FIGS. 4 and 5 are cross sectional views taken along lines 4—4 and 5—5 respectively of FIG. 1.

A feed bunk 10 is illustrated in the drawing, taking the form of an elongated open top structure which may, if desired, be provided with a longitudinal upright central partition 12 setting off a pair of side-by-side compartments 14 and 16.

The distributor or feeder shown in the drawing is suitably mounted on and supported by the feed bunk 10 and takes the form of an elongated transversely elliptical tube 18 having its major transverse axis vertically disposed, as best seen in FIGS. 4 and 5. The tube 18 is preferably made in two sections which include a trough 20 and a cover 22, such sections being provided with outturned, overlapping longitudinal flanges that are in turn connected by suitable fasteners as is particularly clear in FIGS. 1, 4 and 5.

The horizontal tube 18 which directly overlies the partition 12 in spaced relationship thereto communicates at one of its ends directly with a material-receiving hopper 24 having a mixer 26, which may be in the form of a screw, driven by a prime mover 28, such as an electric motor, through belt and pulley means 30 that in turn drives a jackshaft 32.

The prime mover 28 also continuously rotates a primary material advancing means in the tube 18 taking the form of a screw conveyor 34, through chain and sprocket wheel means 36 coupled with jackshaft 32 as well as with the screw 26.

The screw conveyor 34 is journaled only at one end thereof on the hopper 24, normally resting on transversely arcuate bottom 38 of trough 20 for free floating vertical movement toward the transversely arcuate top section 22 of tube 18.

The bottom 38 is provided with a series of spaced-apart openings 40 (see FIG. 4), disposed to discharge material by gravitation into a corresponding receiver 42. Each of the receivers 42 is in the nature of an elongated, transversely arcuate loop having a bight 46 disposed directly above the upper edge of partition 12 in alignment therewith.

The two substantially parallel vertical legs of the loops or receivers 42 are secured, as by welding, directly to the bottom 38 of trough 20. Each receiver has its longitudinal axis in substantial parallelism with the longitudinal axis of the tube 18 with both of its ends open. The sides or legs of the receivers 42 are cut away, as at 48 and 50, such cutaways being identical and diagonally disposed and each being defined by an inclined edge that slopes downwardly from the trough 20 toward the corresponding open end of the receiver 42.

Material is discharged or unloaded periodically from all of the receivers 42 simultaneously by secondary material advancing means in the nature of a screw conveyor 52 common to all of the receivers 42 and extending therethrough in substantial parallelism with the primary screw conveyor 34.

The conveyor 52 is driven by power means such as an electric motor 54 coupled therewith by belt and pulley means 56.

The reversible electric motor 54 has an electric circuit which is provided with a switch 58 to control its direction of rotation and in such circuit there is also provided switch means 60 forming a part of control means for the screw conveyor 52, broadly designated by the numeral 62. Such control means 62 includes an abutment 64 within the path of travel of material being advanced along the tube 18 by the screw conveyor 34, the abutment 64 being in the nature of a panel freely swingable about a horizontal axle 66 disposed transversely of the top section 22 of the tube 18. The panel 64 is adjacent that end of the screw 34 opposite to the hopper 24 and has the switch means 60 mounted directly thereon. Such switch means may take the form of a mercury switch or similar electrical component adapted to close the aforementioned motor circuit to energize the power means 54 whenever the panel 64 is swung to the right (viewing FIG. 1) away from the screw 34 under influence of or in response to build-up of material against the panel 64 within the tube 18.

In operation, the motor 28 is energized to drive the screw conveyor 34 continuously and, assuming that material is supplied continuously thereto from the hopper 24, such material will be advanced along the tube 18 toward the control panel 62.

The receivers 42 will be progressively filled with the material through the openings 40 inasmuch as the screw 52 is initially nonrotating.

After all of the receivers 42 are filled, the material commences building up in the tube 18 against the panel 62, causing it to swing and thereby close the switch 60 to energize the motor 54.

This will drive the screw 52 to immediately empty all of the receivers 42 through one of their open ends into the bunk 10.

In a very short period of time after emptying of the receivers 42 the build-up at the panel 62 will diminish, causing de-energization of the motor 54, whereupon a new cycle commences, progressively filling the receivers 42. Such material as is pushed beyond the panel 62 will fall through an opening similar to openings 40 to the bunk 10 within the confines of a pair of opposed plates 68 depending from the tube 18.

It is to be recognized that the direction of rotation of the screw 52 determines which of the two ends of the receivers 42 receive the material for discharge into the bunk 10. Accordingly, if the partition 12 is used, the operator need merely manipulate the switch 58 to feed into either or both of the compartments 14 and 16. The cutaways 48 and 50 assure discharge on the corresponding sides of partition 12.

It can now be appreciated that, inasmuch as the plurality of receivers 42 are identical and each receives the same amount of material, the distribution throughout the length of the bunk 10 is uniform. It has been found in practice that the various ingredients of the material being distributed will not be separated through use of a feeder as above described but tend to become more thoroughly mixed during conveyance and prior to discharge into the bunk 10.

The transverse configuration of the tube 18 and its transverse area in relationship to the diameter of the screw 34 are important to the present invention because of the increased capacity and anti-clogging features. Material can be choke fed into the tube 18 to its fullest capacity and the floating screw 34 will rise and fall as conditions require, as distinguished from a construction wherein the conveyor tube is of substantially the same diameter as that of the screw 34 and of substantially the same circular cross-sectional configuration.

It has been found also that the construction is such as to solve all problems of interference by animals such as cattle along the bunk 10. First of all, the motors 28 and 54 are disposed high above the normal reach of the animals and are not subjected to the adverse effects of the material itself. Secondly, the receivers 42 ahe made in a manner to prevent interference of discharge by the animals and to protect them from injury during the rotation of the screw 52.

Having thus described the invention what is claimed as new and desired to be secured by Letters Patent is:

1. A material distributor comprising:
    a material trough having an elongated, substantially horizontal bottom provided with a pair of spaced openings disposed for gravitational flow of material therethrough;
    a primary screw conveyor in the trough for moving the material along the latter longitudinally of said bottom toward one one end of the trough whereby to feed the material through said openings;
    an elongated loop for each opening respectively, said loop having a bight longitudinally parallel with and spaced below said bottom and provided with a pair of spaced, opposed end edges extending upwardly toward said bottom to define open ends therefor, each loop being aligned with a corresponding opening for receiving material from the trough;
    a rotatable secondary screw conveyor substantially parallel with the primary conveyor and extending through the open ends of said loops for moving the material along the latter longitudinally of said bights and discharging the same through one of the ends of each of the loops when the secondary screw conveyor rotates in one direction and discharging the material through the other end of each of the loops when the secondary screw conveyor rotates in the opposite direction; and
    reversible power means for alternately rotating said secondary screw conveyor in opposed directions.

2. A material distributor comprising:
    a material trough having an elongated, substantially horizontal bottom provided with a pair of spaced openings disposed for gravitational flow of material therethrough;
    primary material advancing means in the trough for moving the material along the latter longitudinally of the bottom toward one end of the trough whereby to feed the material through the openings;
    an elongated, tubular receiver for each opening respectively, each receiver being spaced below said bottom and provided with an end edge extending toward said bottom to define an open end therefor, said receivers being spaced apart and aligned with respective openings for receiving material from the trough; and
    secondary material advancing means in each receiver for moving the material therewithin longitudinally thereof and toward its open end, said receiver having means thereon for laterally discharging the material therefrom in response to the movement of material toward said open end.

3. A material distributor as set forth in claim 2, wherein each of said receivers is provided with a side having an inclined upper edge extending downwardly as said open end thereof is approached, said edge defining said lateral discharging means.

4. A material distributor comprising:
    a material trough having an elongated, substantially horizontal bottom provided with a pair of spaced openings disposed for gravitational flow of material therethrough;
    primary material advancing means in the trough for moving the material along the latter longitudinally of the bottom toward one end of the trough whereby to feed the material through the openings;
    an elongated, tubular receiver for each opening respectively, each receiver being spaced below said bottom and provided with a pair of opposed end edges extending toward said bottom to define a pair of opposed, open ends therefor, said receivers being spaced apart and aligned with respective openings for receiving material from the trough; and
    reversible secondary material advancing means in each receiver for alternately moving material therewithin longitudinally thereof and toward said open ends as the secondary advancing means moves in opposed directions, said receiver having means on opposed sides thereof for alternately discharging the material laterally from respective sides in response to alternate movement of said material to respective open ends.

5. A material distributor as set forth in claim 4, wherein said discharging means includes an inclined upper edge for each side of the receiver respectively, the edge of one of the sides extending downwardly toward one end of the receiver, the edge of the other side extending downwardly toward the opposite end of the receiver.

6. A material distributor comprising:
  a material trough having an elongated, substantially horizontal bottom provided with a pair of spaced openings disposed for gravitational flow of material therethrough;
  a rotatable screw conveyor mounted within the trough for vertical movement with respect thereto;
  a prime mover coupled with said screw conveyor for rotating the same continuously to advance the material longitudinally of said bottom whereby to feed the material through the openings;
  an elongated, tubular receiver for each opening respectively, each receiver being spaced below said bottom and provided with an end edge extending toward said bottom to define an open end therefor, said receivers being spaced apart and aligned with respective openings for receiving material from the trough; and
  secondary material advancing means in each receiver for moving the material therewithin longitudinally thereof and toward its open end.

7. A material distributor as set forth in claim 6, wherein said prime mover is coupled to said screw conveyor adjacent one end thereof, the opposite end of the screw conveyor being normally supported on the bottom of said trough and being free therefrom for vertical floating movement with respect thereto.

8. A material distributor comprising:
  a transversely elliptical, material-receiving tube provided with a trough having an elongated, substantially horizontal bottom provided with a longitudinal series of spaced openings disposed for gravitational flow of material therethrough;
  a primary screw conveyor in the trough normally spaced from the top of the tube, vertically movable in the tube and extending longitudinally of said bottom;
  a prime mover coupled with said conveyor for rotating the same continuously to advance the material along the trough longitudinally of said bottom toward one end of the trough whereby to feed the material through said openings;
  a material receiver beneath each opening, respectively, each receiver comprising a loop secured to said bottom and having a pair of opposed, open ends together with an elongated bight longitudinally parallel with said bottom;
  a secondary screw conveyor substantially parallel with the primary conveyor and extending through the loops longitudinally of said bights for discharging material through one of the open ends of each of the loops;
  power means coupled with said secondary conveyor for rotating the latter; and
  control means responsive to build-up of material at said one end of the trough and coupled with said power means for actuating the latter only upon said build-up of material.

9. A material distributor for use with an elongated, open top, material-receiving bunk provided with a longitudinal partition, said material distributor comprising:
  a material trough provided with means thereon for mounting the same in spaced relationship above the bunk and having an elongated, substantially horizontal bottom provided with a longitudinal series of spaced openings disposed for gravitational flow of material therethrough;
  a rotatable primary screw conveyor in the trough and extending longitudinally of said bottom;
  a prime mover coupled with said conveyor for rotating the same continuously to advance the material along the trough longitudinally of said bottom toward one end of the trough whereby to feed the material through said openings;
  a material receiver beneath each opening, respectively, each receiver comprising a loop secured to said bottom directly above said partition and having a pair of opposed, open ends together with an elongated bight longitudinally parallel with said bottom;
  a rotatable secondary screw conveyor substantially parallel with the primary conveyor and extending through each loop longitudinally of the corresponding bight for alternately discharging material through the open ends of the loop as the secondary screw conveyor is rotated in opposed directions;
  reversible power means coupled with said secondary conveyor for alternately rotating the latter in said opposed directions; and
  control means responsive to build-up of material at said one end of the trough and coupled with said power means for actuating the latter only upon said build-up of material, said loops each having means for laterally discharging material from each end thereof under the influence of said secondary screw conveyor whereby the material will fall into the bunk on one side of the partition when the secondary conveyor rotates in one direction and will fall into the bunk on the opposite side of the partition when the secondary conveyor rotates in the opposite direction.

10. The invention of claim 9, wherein each of said loops is provided with a pair of spaced, opposed sides each having an inclined upper edge defining the lateral discharging means therefor, the edge of one of the sides extending downwardly toward one end of the loop, the edge of the other side extending downwardly toward the opposite end of the loop.

11. A material distributor for use with an elongated, open top feed bunk having a longitudinal partition dividing the same into a pair of compartments, said material distributor comprising:
  a horizontal, transversely elliptical tube coextensive in length with the bunk, supported thereby and spaced above the partition, said tube having a bottom provided with a series of spaced outlet openings throughout the length thereof in alignment with the partition;
  a primary screw conveyor in the tube throughout the length thereof and normally resting on said bottom in spaced relation to the top of the tube for floating movement toward and away from said top;
  a prime mover coupled with said conveyor for rotating the same continuously to advance the material along the tube longitudinally of said bottom toward one end of the tube whereby to feed the material through said openings;
  an elongated, transversely arcuate, material-receiving loop beneath each opening respectively between said partition and said bottom and secured to the latter with the longitudinal axes of the loop and the tube in parallelism, each loop having a pair of opposed, open, material discharge ends;
  a secondary screw conveyor common to the loops and extending therethrough in substantial parallelism with the primary conveyor;
  a reversible electric motor having a circuit and coupled with said secondary conveyor for rotating the latter;
  switch means in said circuit for controlling the direction of rotation of the secondary conveyor;
  a panel in said tube overlapping that end of the primary conveyor proximal to said one end of the tube and swingable toward said one end of the tube in response to material moved thereagainst by the primary conveyor;
  a switch mounted on said panel and coupled in said circuit for energizing said motor only upon swinging of the panel toward said one end of the tube, each loop being cut away at each end thereof, respectively, the cutaways being diagonally spaced, whereby material is discharged through one end of the loop into one compartment when the secondary conveyor rotates in one direction and into the other compartment through the opposite ends of the loops when the secondary conveyor rotates in the opposite direction.

References Cited by the Examiner

UNITED STATES PATENTS

| | | | |
|---|---|---|---|
| 179,149 | 6/1876 | Barnes | 198—214 X |
| 951,911 | 3/1910 | Hoehne | 198—78 X |
| 2,277,879 | 3/1942 | Ness | 198—37 |
| 3,119,526 | 1/1964 | Sutton | 222—56 |

SAMUEL F. COLEMAN, *Primary Examiner.*

WILLIAM B. LA BORDE, *Examiner.*